Patented Jan. 9, 1923.

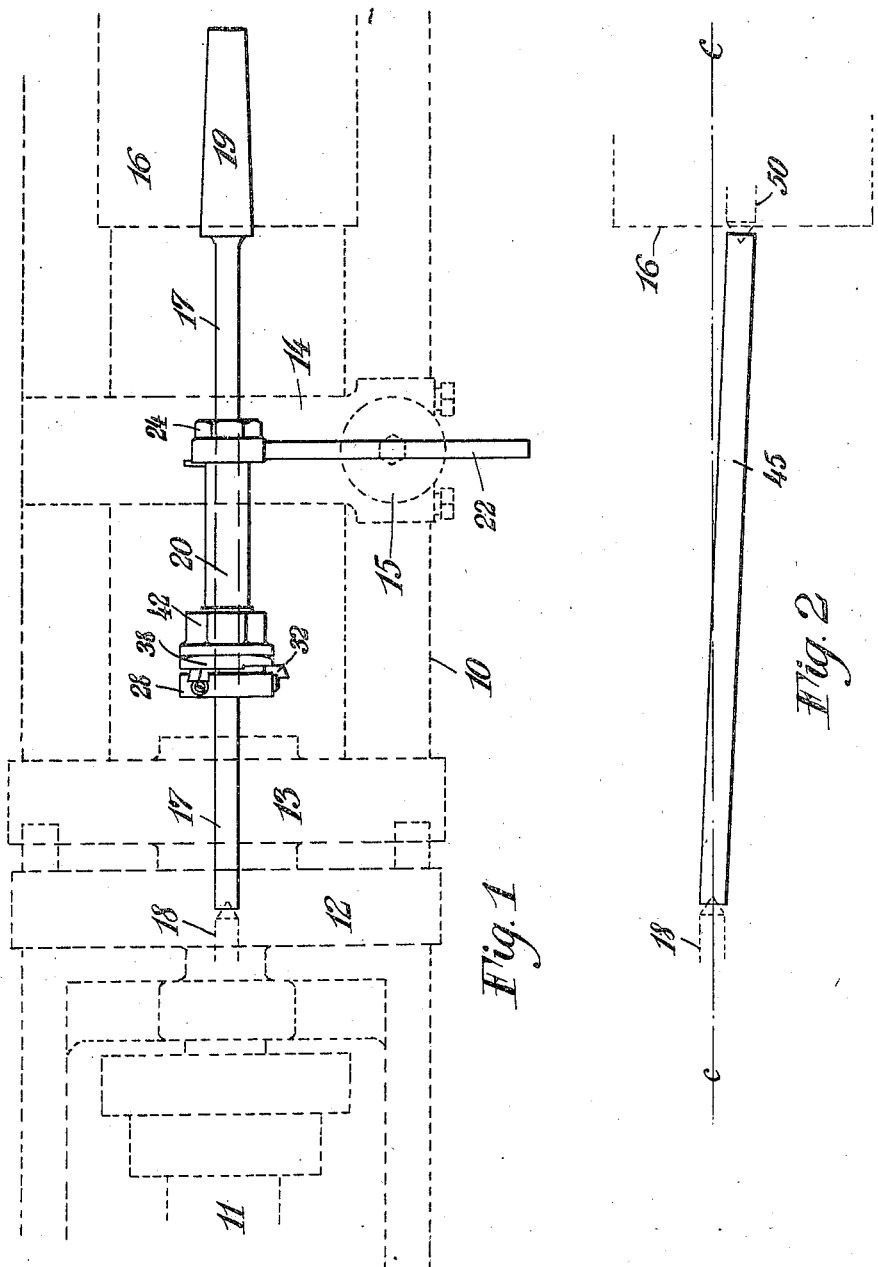

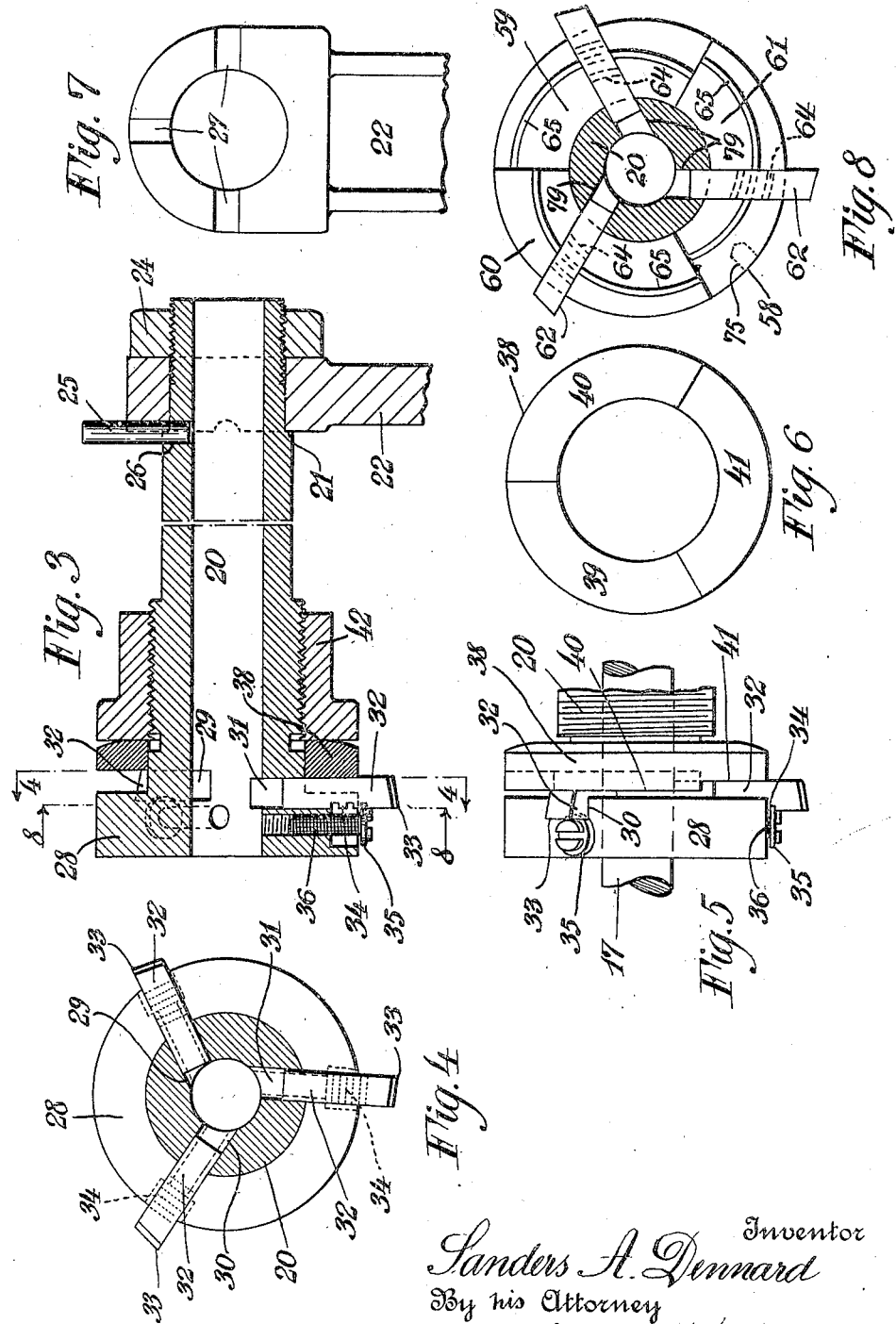

1,441,562

UNITED STATES PATENT OFFICE.

SANDERS A. DENNARD, OF EASTPORT, FLORIDA.

LATHE BORING TOOL.

Application filed March 5, 1921. Serial No. 450,007.

*To all whom it may concern:*

Be it known that I, SANDERS A. DENNARD, a citizen of the United States, and resident of Eastport, in the county of Duval and State of Florida, have invented certain new and useful Improvements in Lathe Boring Tools, of which the following is a specification.

This invention relates to lathe boring tools and the object of the invention is to provide an improved boring tool or cutter. One object of the invention is to provide a boring tool adapted to be supported in both the head stock and the tail stock of the lathe, while the cutter is fed by the lathe carriage, and whereby great strength, rigidity and accuracy in the operation of the tool are obtained.

Another object is to provide a tool, supported as aforesaid, adapted for taper boring as well as straight boring. Still another object is to provide novel and improved means for supporting and adjusting the cutters.

With the above and other ancillary objects in view my invention is embodied in a boring tool as hereinafter described and claimed and as illustrated in the accompanying drawings in which—

Fig. 1 is a plan view of a boring tool embodying my invention showing the same in position on a lathe, the latter being shown in dotted lines.

Fig. 2 shows the supporting bar in position for tapered boring.

Fig. 3 is a central sectional view through the tool head and cutters, parts being broken away.

Fig. 4 is a transverse sectional view on line 4—4 of Figure 3.

Fig. 5 is a side view of the cutters and clamping means therefor.

Fig. 6 is a face view of the clamping washer or ring.

Fig. 7 is a view of the tool head holder or post, parts being broken away.

Fig. 8 is a view on line 8—8 of Figure 3, showing a modification.

Referring to Figure 1 the lathe is shown in outline and in dotted lines. The reference numeral 10 denotes the lathe as a whole, 11 is the head stock, 12 the chuck, 13 the work, 14 the carriage, 15 the tool post and 16 the tail stock.

The tool comprises a supporting bar or rod 17 which is supported at one end in the head stock center 18 and at the other end by means of a tapered portion 19 supported in a taper socket in the tail stock. The bar is thus held firmly clamped in position and affords a very strong support for the tool. The bar 17 is rigidly mounted and does not rotate.

On the bar 17 is mounted a tool head 20 which is in the form of a sleeve as seen in Figure 3 and adapted to slide on the bar 17. The tool head is provided with a shoulder 21 and is clamped in the tool holder 22, the latter being forced against the said shoulder 21 and firmly clamped by a nut 24. 25 is a pin adapted to enter a hole 26 in the tool head and seat in any one of the grooves 27, 27 in the tool holder to prevent rotation of the tool head in the tool holder. The latter is suitably secured to the tool post 15 on the lathe carriage 14, so that as the latter is moved towards the work 13 (by the usual means not shown) the tool head 20 slides along the bar 17 as will be understood.

The tool head is formed with an enlargement 28 which may be termed a cutter head, which is provided with three, substantially radial, grooves 29, 30 and 31 of unequal depths. In this instance the groove 29 is deeper than the groove 30 and the latter is deeper than the groove 31.

Each of the grooves receives a tool bit or cutter 32. Each cutter is provided with a cutting edge 33 and teeth 34. The latter are adapted to be engaged by the head 35 of the adjusting screw 36.

It follows, that the cutters are adjustable radially by means of their respective screws 36 and that the cutters are offset laterally of the tool so that as the boring proceeds the cutters will act progressively and successively as will be understood.

The cutters are clamped in the cutter head, in the grooves therein, by a stepped washer 38 which is provided with three steps 39, 40 and 41 which are offset to correspond with the different depths of the grooves 29, 30 and 31 insuring that an even pressure is exerted upon all the cutters when the clamping nut 42 is screwed tight against the washer.

If it is desired to use the tool for taper boring, a taper boring bar 45, see Figure 2, is employed. This bar is adapted to be used within the tool holder and the tool head in the same manner in which the bar 17 is used. The one end of the taper boring bar 45 is supported in the head stock centre 18 aforesaid, the other end of the taper boring bar is without the taper 19 used on bar 17 and is supported on a center 50 in the tail stock 16 which in this case is moved to one side as shown to provide for the taper boring. The bar 45 is of the same diameter throughout. Only one cutter will be used in boring tapers, the other two cutters being set back far enough to be out of engagement.

Referring to Figure 8 it will be seen that the washer 58 is provided with three steps 59, 60 and 61 of different graduated heights. Each step is provided with a curved cam ridge 65 adapted to engage the grooves 64 on the cutters 62 which slide in recesses 79. It will be noted that in using the construction shown in Figure 8, the grooves or notches 64 in the cutters are on the opposite sides of the grooves between the teeth 34 shown in Figure 3, in which said grooves face the tool head 28, while in Figure 8 the grooves 64 face the stepped washer 58 which corresponds to the stepped washer 38 in Figure 3.

A hole 75 is provided for the use of a spanner (not shown) for holding the steppped washer 58 when the nut 42 back of it is adjusted. In this case the cutters are adjusted by rotating the washer 58 as will be understood.

It will be seen from the foregoing that the boring tool herein disclosed is of a very simple construction, provides for great rigidity in its supporting means and consequent accuracy in operation. Also that a wide range of adjustment is cared for.

During the operation the lathe carriage is moved as usual along the lathe towards the work, the carriage taking the tool holder along and thus feeding the cutters or bits into the work. The tool head is held firmly in the holder and the pin 25 positively prevents rotation of the head relative to the holder. The offset position of the cutters facilitates the cutting as will be understood and there are no obstructions to quick adjustment of the cutters.

While I have disclosed my invention herein in its preferred form it will be understood that changes and alterations in the construction shown may be made within the principle of the invention and the scope of the appended claims and that this invention is not limited to any exact form, number or shape of cutters.

I claim:—

The combination with a lathe having a head stock, a tail stock and a tool holder, of a cutting tool comprising a solid supporting bar, the one end of which is adapted to be supported in the head stock of the lathe, the other end of said bar being tapered and adapted to be supported in the tail stock of said lathe, a tool head mounted to slide on the said bar, a cutter head formed at the front end of said tool head, cutting tools in said cutter head, means for clamping said tool head in the said tool holder for operating said tool head towards and away from the work, a hole in said tool head, a plurality of grooves in said tool holder and a pin in said hole and adapted to engage any one of the said grooves for preventing rotative movement between said tool head and said tool holder.

Signed at Jacksonville, in the county of Duval and State of Florida, this 21st day of February A. D. 1921.

SANDERS A. DENNARD.